United States Patent
Ting et al.

(10) Patent No.: US 9,625,971 B2
(45) Date of Patent: Apr. 18, 2017

(54) SYSTEM AND METHOD OF ADAPTIVE VOLTAGE FREQUENCY SCALING

(71) Applicant: Taiwan Semiconductor Manufacturing Company, Ltd., Hsin-Chu (TW)

(72) Inventors: Kai-Yuan Ting, San Jose, CA (US); Sandeep Kumar Goel, Dublin, CA (US); Ashok Mehta, Los Gatos, CA (US)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 347 days.

(21) Appl. No.: 14/152,607

(22) Filed: Jan. 10, 2014

(65) Prior Publication Data

US 2015/0198997 A1 Jul. 16, 2015

(51) Int. Cl.
*G06F 1/32* (2006.01)
*G06F 11/30* (2006.01)
(Continued)

(52) U.S. Cl.
CPC ............ *G06F 1/3215* (2013.01); *G06F 1/324* (2013.01); *G06F 1/3228* (2013.01); *G06F 1/3243* (2013.01); *G06F 1/3296* (2013.01); *G06F 1/08* (2013.01); *G06F 1/3203* (2013.01); *G06F 11/30* (2013.01); *G06F 11/3024* (2013.01); *G06F 11/3409* (2013.01); *G06F 11/3466* (2013.01);
(Continued)

(58) Field of Classification Search
CPC ........ G06F 1/08; G06F 1/3203; G06F 1/3206; G06F 3/0364; G06F 11/30; G06F 11/3024; G06F 11/3409; G06F 11/3466; G06F 12/0866

USPC ................ 713/300, 320, 323, 330
See application file for complete search history.

(56) References Cited

U.S. PATENT DOCUMENTS 7,263,457 B2 8/2007 White et al.
7,290,156 B2 10/2007 Gaskins
(Continued)

FOREIGN PATENT DOCUMENTS

TW I243983 11/2005
TW I260544 8/2006
TW I417740 12/2013

OTHER PUBLICATIONS

Walter Croce, Cell Phones Demand Better Battery Life, Energy Saving Techniques Like System-Level Intervention and Foundation—Semiconductor Structures Help to Lighten the Batter's Load,' Journal Library, Wireless System Design Aug. 2008, Jul./Aug. 2004, 6 pages.
(Continued)

*Primary Examiner* — Michael J Brown
(74) *Attorney, Agent, or Firm* — Haynes and Boone, LLP

(57) ABSTRACT

Provided is a system that includes a monitoring unit, processing units, and peripheral units. Each of the processing units is linked to the monitoring unit and each of the peripheral units is also linked to the monitoring unit. Each of the processing units is configured to transmit requests to and subsequently receive responses from at least one of the peripheral units through the monitoring unit. The monitoring unit is configured to measure and store delays between the responses and the respective requests.

20 Claims, 8 Drawing Sheets

(51) Int. Cl.
  *H04M 1/73*      (2006.01)
  *G06F 12/0866*   (2016.01)
  *G06F 11/34*     (2006.01)
  *G06F 1/08*      (2006.01)

(52) U.S. Cl.
  CPC ........... *G06F 12/0866* (2013.01); *H04M 1/73* (2013.01); *Y02B 60/1217* (2013.01); *Y02B 60/1239* (2013.01); *Y02B 60/1285* (2013.01)

(56) References Cited

U.S. PATENT DOCUMENTS

| | | | |
|---|---|---|---|
| 7,386,739 B2 | 6/2008 | Ghiasi et al. | |
| 2008/0071939 A1* | 3/2008 | Tanaka | G06F 11/3419 710/18 |
| 2014/0089697 A1* | 3/2014 | Kim | G06F 1/26 713/320 |
| 2015/0146697 A1* | 5/2015 | Gibbon | H04W 52/30 370/336 |

OTHER PUBLICATIONS

Qiang Wu et al., "Voltage and Frequency Control with Adaptive Reaction Time in Multiple-Clock-Domain Processors," Proceedings of the 11$^{th}$ Int'l Symposium on High-Performance Computer Architecture, 2005 IEEE, 12 pages.

Martin Peter Michael, "Energy Awareness for Mobile Devices," Paper for Research on Energy Awareness, Departing of Computer Science, University of Helsinki, Finland, Autumn 2005, pp. 1-8.

* cited by examiner

| Current Power State | Mean Performance Index ($\mu_{mean}$) |
| --- | --- |
| Power State 1 (VF Setting 1) | 0.1 |
| Power State 2 (VF Setting 2) | 0.3 |
| Power State 3 (VF Setting 3) | 0.5 |
| Power State 4 (VF Setting 4) | 0.7 |
| Power State 5 (VF Setting 5) | 0.9 |

FIG. 6

| Range of Performance Index ($\mu^i$) | Next Power State |
|---|---|
| 0.0-0.2 | Power State 1 (VF Setting 1) |
| 0.2-0.4 | Power State 2 (VF Setting 2) |
| 0.4-0.6 | Power State 3 (VF Setting 3) |
| 0.6-0.8 | Power State 4 (VF Setting 4) |
| 0.8-1.0 | Power State 5 (VF Setting 5) |

FIG. 7

SYSTEM AND METHOD OF ADAPTIVE VOLTAGE FREQUENCY SCALING

BACKGROUND

Semiconductor process technology continues to scale down, which enables an integration of an increasing number of central processing units (CPUs) and peripheral devices into one system. Such integration generally provides many benefits, such as more processing power within a computer server or a system-on-chip (SoC) and more functionality in a mobile device or a cellular phone. For example, with multiple processor cores and multiple peripheral devices integrated inside a small package, a cellular phone can provide end users with a variety of features, such as voice calls, text messaging, multimedia applications, wired and/or wireless network, camera, global positioning system (GPS), among others. To meet the demands for more performance and more features, system designers face many challenges. One of the challenges is effective power management. For example, various processor cores and peripheral devices within a cellular phone are generally powered by a single source, such as a battery. The battery's capacity is generally limited by its size that in turn is limited by a small form factor of the cellular phone's package. Therefore, how to effectively utilize the battery's power becomes a key issue in such a system design.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIGS. 6 and 7 are exemplary user-defined power state lookup tables.

DETAILED DESCRIPTION

Figure 1:
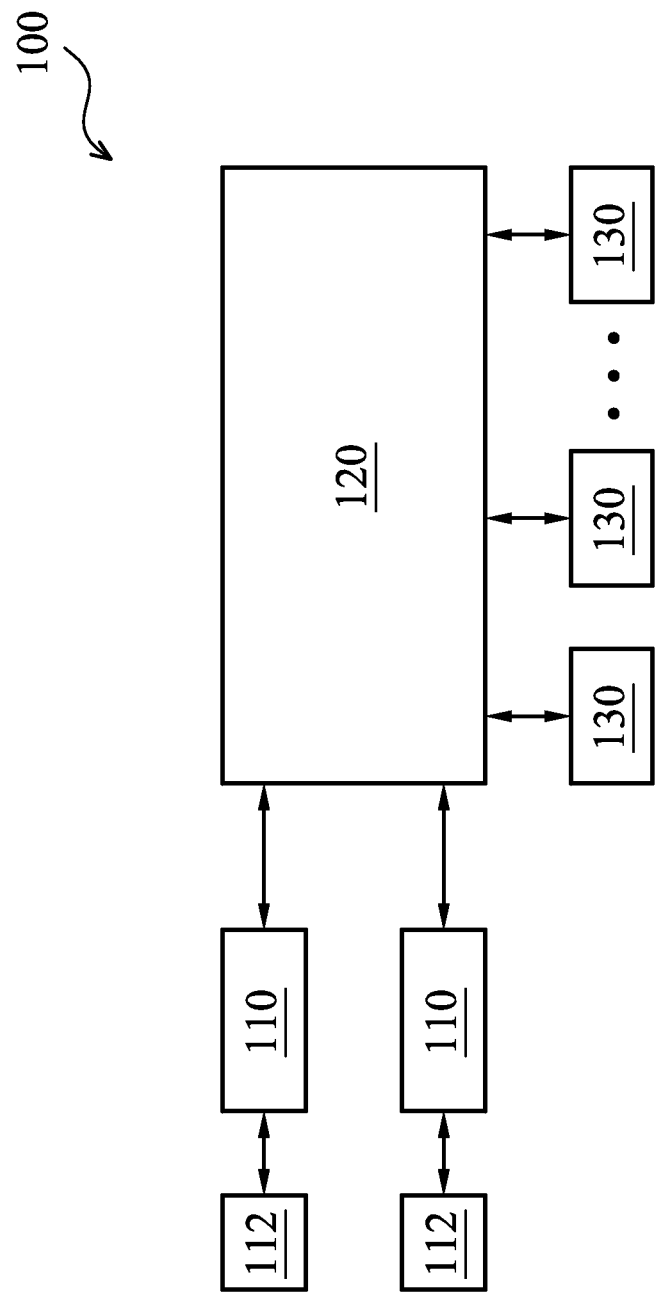
FIG. 1 is an exemplary multi-core system that may benefit from one or more embodiments of the present disclosure.

The following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

FIG. 1 is a simplified block diagram of an exemplary multi-core system 100 that may benefit from one or more embodiments of the present disclosure. The system 100 includes a plurality of processor cores 110 and a plurality of peripheral devices (or input/output devices) 130. The processor cores 110 are also referred to as central processing units (CPUs), processing units, or, simply, processors, in the present disclosure. The processor cores 110 and the peripheral devices 130 are interconnected through a network 120.

In an embodiment, the system 100 further includes a plurality of operations controller devices 112 that are coupled to the processor cores 110. With proper instructions from the processor cores, the operations controller devices 112 can dynamically adjust some operating conditions of the processor cores and/or other portions of the system 100. For example, an operations controller device can increase or decrease a power supply voltage of the processor core(s), and increase or decrease a clock frequency of the processor core(s).

In an embodiment, the system 100 is a portion of a modern mobile device, such as a cellular phone that provides a variety of applications to end users, such as voice, texting, networking, and multimedia applications. The processor cores 110 may include different types of processors, such as a digital signal processor (DSP), a microcontroller, and a general purpose processor such as a Reduced Instruction Set Computer (RISC) processor. The processor cores 110 are responsible for running operating system (OS) software and various pieces of application software.

The peripheral devices 130 include different types of input/output (IO) devices for providing end functions to the user. For example, one type of IO device is a display device, such as a Liquid Crystal Display (LCD) device with or without touchscreen capability. Another type of IO device is a connectivity device, such as an Ethernet port, a Universal Serial Bus (USB) port, a Universal Asynchronous Receiver/

Transmitter (UART) controller, a wireless network controller for connecting the system 100 to a wireless local area network (WLAN), among others. Another type of IO device is a cellular device, such as a Global System for Mobile Communications (GSM) transceiver, a Wideband Code Division Multiple Access (WCDMA) transceiver, and a General Packet Radio Service (GPRS) transceiver. The peripheral devices 130 may include memory devices, direct memory controllers (DMAs), audio codecs, a camera module, a timer device, and so on.

The processor cores 110 and the peripheral devices 130 are linked (or connected) by the network 120 for communications between them. In an embodiment, each one of the processor cores 110 communicates with one or more peripheral devices 130. Therefore, a point-to-point network between each pair of processor/peripheral is not efficient from a system routing point of view. Instead, an on-chip multi-layer high speed bus, such as a network-on-chip (NOC), is used. In the exemplary system 100 (FIG. 1), the network 120 is a NOC, which serves as a transportation sub-system for the information traffic between the processor cores 110 and the peripheral devices 130. In an embodiment, the communication between the processor cores 110 and the peripheral devices 130 are digitized into packets. For example, a packet from a processor to a peripheral device includes a source address identifying the processor, a destination address identifying the peripheral device, and one or more instructions to be performed by the peripheral device. Upon receiving the packet, the peripheral device performs the instructions and subsequently returns a response packet to the processor. The response packet similarly includes a source and destination address and further includes a result associated with the instruction(s). For example, the result could include data read from a memory, data collected from a user, or simply an acknowledgement of the receipt of the instruction. The network 120 includes a router (or a switch) that recognizes the source/destination addresses of a packet and relays the packet to the proper recipient. In the system 100, a packet may be a unicast packet (from one of the processors 110 to one of the peripheral devices 130), a multicast packet (from one of the processors 110 to multiple ones of the peripheral devices 130), or a broadcast packet (from one of the processors 100 to all of the peripheral devices 130).

The system 100 further includes power regulators and distributors (not shown) for supplying power from a power source, such as a battery, to the processor cores 110, the peripheral devices 130, and the network 120. The system 100 further includes clock sources and clock distribution network (not shown) for controlling an operating frequency of the processor cores 110, the peripheral devices 130, and the network 120. For example, the clock sources may include an oscillator, a phase-locked loop (PLL), a frequency divider, a clock multiplier, and so on.

With all of these components in the system 100, managing power consumption of various devices so as to conserve energy becomes a key issue. This is because the system 100 is usually powered by a single power source: the battery, which has a limited capacity from one charge to the next. One approach to this issue is based on a general observation that the dynamic power dissipation of a semiconductor device is proportional to the square of a power-supply voltage applied to the semiconductor device, and is proportional to the frequency of a clock signal that is applied to the semiconductor device. Another general observation is that the processors 110 don't need to run at all times. For example, a processor may stay in a standby mode until a task is dispatched to the processor. During the standby mode, the processor may run at very low frequency or low voltage. Only upon receiving the task is the processor switched to a full swing clock frequency and/or voltage. Therefore, by dynamically adjusting the supply voltage and clock frequency of the processor cores 110, power consumption of the system 100 can be reduced. A further observation is that not all tasks running on the system 100 demand the same amount of power consumption. For example, a task that sets an appointment in a calendar application does not consume as much power as another task that runs a three-dimensional (3D) gaming application. Based on the above observations, one power management method is to categorize applications (or tasks) to be run on the system 100 into a number of policies wherein each of the policies is associated with a power requirement in the form of a voltage/frequency pair. When an application is dispatched by an OS kernel of the system 100 to one of the processors 110, the associated policy is invoked so that the operations controller device 112 sets the voltage/frequency of the respective processor accordingly. However, such an approach usually employs a fixed application-to-policy mapping and therefore is not easily scalable for new applications.

Figure 2:
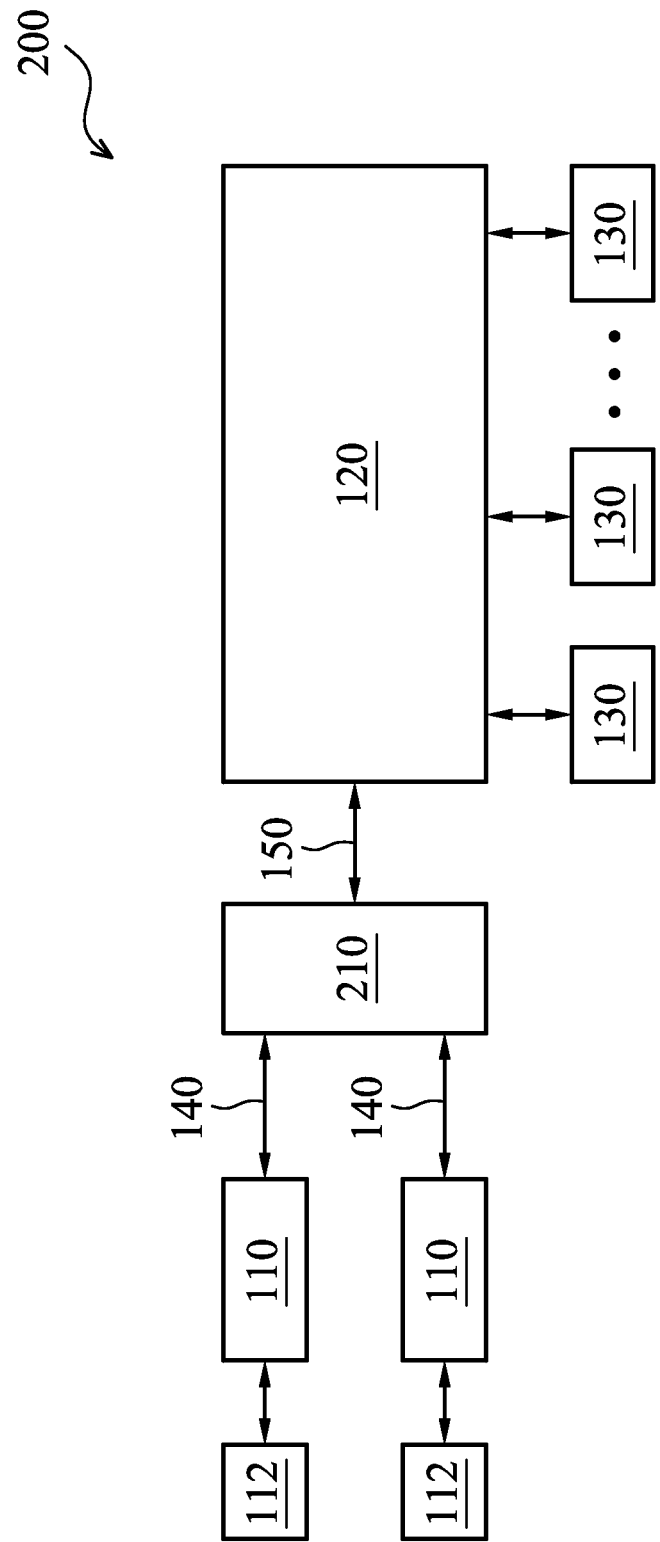
FIG. 2 is an exemplary multi-core system according to various aspects of the present disclosure.

FIG. 2 illustrates a multi-core system 200 according to various aspects of the present disclosure. The system 200 is similar to the system 100, but the system 200 includes a traffic monitor 210 that is coupled between the processor cores 110 and the network 120 with communication links 140 and 150 respectively. The traffic monitor 210 is configured to collect statistics about the transactions that flow between the processor cores 110 and the peripheral devices 130. The OS kernel (not shown) periodically accesses the statistics and adjusts the operation conditions of the system 200 accordingly. The collecting, assessing, and adjusting operations will be described in greater details in later sections of the present disclosure. The rationale underlying the architecture of the system 200 is that the processor cores 110, when running, generally consume more power than the peripheral devices 130. Therefore, it is beneficial to know, for a given period of time (a sampling period), how much of that is consumed by transactions that have been running on the processor cores 110 rather than on the peripheral devices 130. By evaluating the transaction statistics of a processor core for one or more sampling periods, an appropriate power state of the processor core, such as a voltage and frequency setting, can be predicted and subsequently applied to the processor core so as to adapt it to such transaction pattern. This method does not rely on an application-policy mapping. Rather, it analyzes the processor's recent activity and adjusts its operational voltage and frequency adaptively. Therefore, it has the ability of on-the-fly learning and is more flexible than the fixed policy-based voltage-frequency scaling method. This method is referred to as adaptive voltage and frequency scaling (AVFS) in the present disclosure.

In an embodiment, the adaptation of the voltage/frequency setting of a processor 110 is based on an estimate of an energy loss and performance loss for the processor 110 during a sampling period. For example, during a sampling period when the processor 110's supply voltage is V1, a task that requires a voltage lower than V1 will result in a loss of energy. In another word, that task could be run on the processor 110 with a lower voltage while still satisfying its need. On the other hand, a task that requires a voltage higher than V1 will cause a loss of performance because the task will not be able to complete on time with the processor 110's supply voltage fixed at V1. Based on empirical data, tasks primarily running on the processor cores 110 are statistically more performance oriented. Thereby, increasing the supply voltage of the processor cores 110 when running such tasks will reduce the performance loss of the system 200. In contrast, tasks primarily running on the peripheral devices 130 are statistically less performance oriented. Thereby, decreasing the supply voltage of the processor cores 110 when running such tasks will reduce the energy loss of the system 200. Therefore, based on the transaction statistics collected by the monitor device 210, it is possible to predict the transaction pattern for the immediate future and subsequently adjust the supply voltage and/or operating frequency of the processor cores 110 in order to minimize the performance loss, the energy loss, or a combination thereof.

Figure 3A:
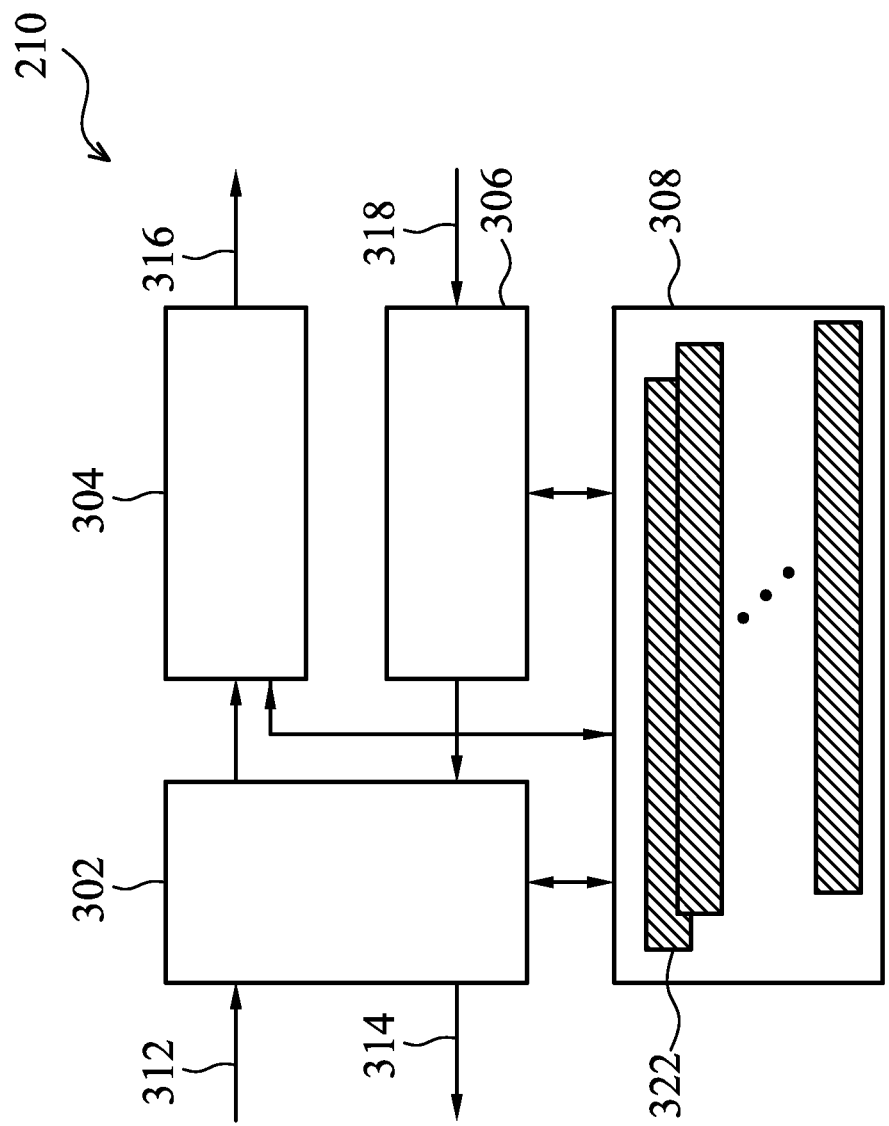
FIG. 3A is a diagrammatic view of a portion of a device that collects transaction statistics in a multi-core system according to various aspects of the present disclosure.

FIG. 3A shows a diagrammatic view of a portion of the monitor device 210, in accordance with an embodiment. The monitor device 210 includes an address decoder 302, a start time keeper 304, a finish time keeper 306, and a storage unit 308. The address decoder 302 is linked to the processor cores 110 (FIG. 2) through inputs 312 and outputs 314. The start/finish time keepers, 304 and 306, are linked to some routing logic of the network 120 (FIG.2) through outputs 316 and inputs 318 respectively. The storage unit 308 houses a plurality of records 322. Each record 322 stores some statistics about transactions between one of the processor cores 110 and one of the peripheral devices 130.

The working mechanism of the monitor device 210 can be explained as follows. When one of the processor cores 110 runs a task, it generates one or more instructions (or instruction packets) that are destined to one or more peripheral devices 130. These instructions pass through the monitor device 210, more specifically through the address decoder 302 and the start time keeper 304, before they are routed by the network 120 to their proper destination(s). For each of these instructions, the address decoder 302 recognizes the destination/source address of the instruction; the start time keeper 304 gets a current timestamp as a start time of the instruction; and a record 322 is created and stored in the storage unit 308. The record 322 indicates the identity of the processor core, the identity of the destination peripheral device, and the instruction's start time. After the peripheral device has completed the instruction, it sends back a response (or a response packet), such as an acknowledgement packet. This response passes through the monitor device 210, more specifically through the finish time keeper 306 and the address decoder 302, before it is received by the respective processor core. Similarly, the finish time keeper 306 gets a current timestamp as a finish time of the respective instruction, the address decoder 302 recognizes the destination/source address of the response, and then the record 322 is refreshed (or updated) with the instruction's finish time.

Figure 3B:
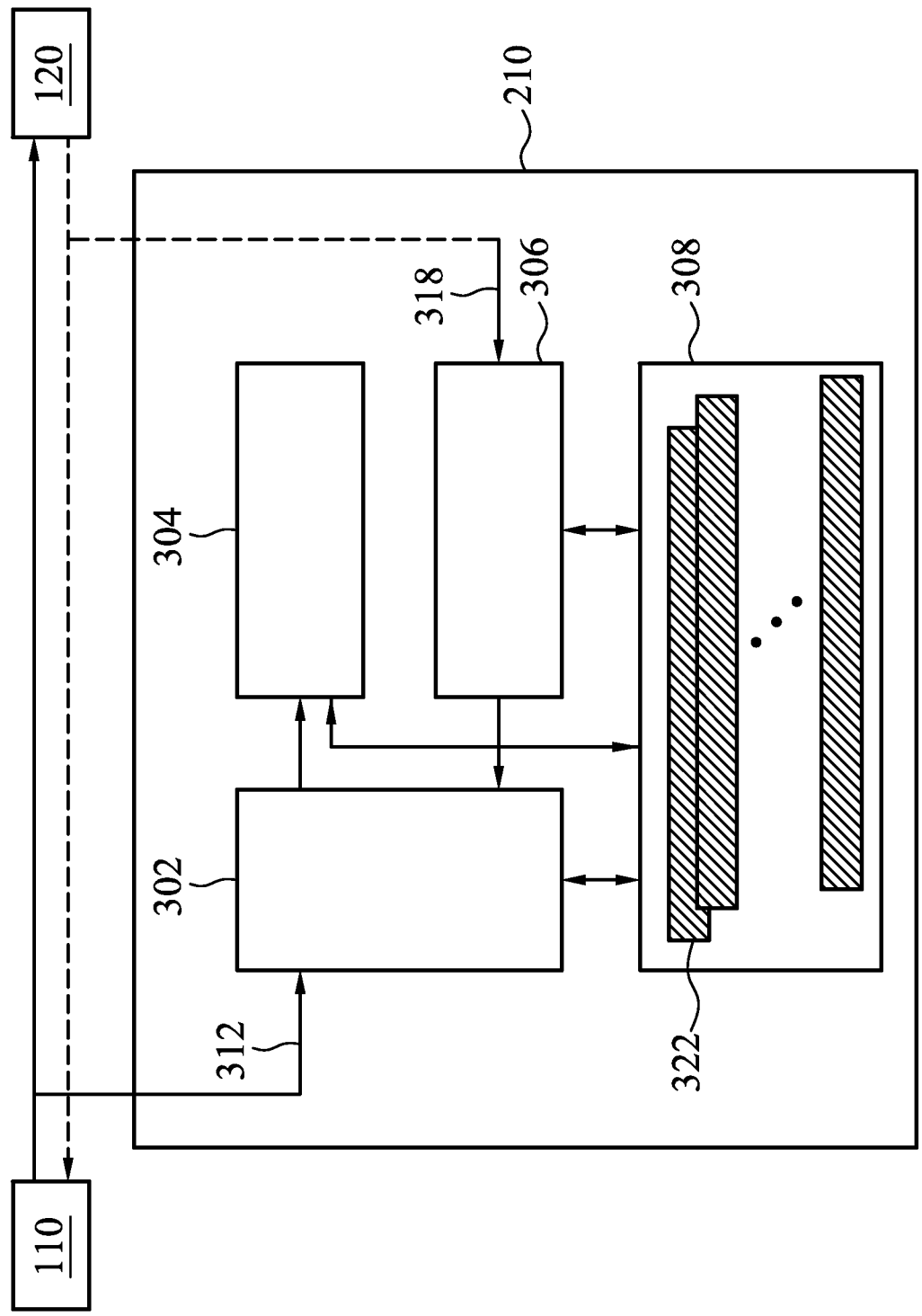
FIG. 3B illustrates an embodiment of the device of the FIG. 3A.

In an embodiment, the monitor device 210 is sandwiched between the processor cores 110 and the network 120 so that all of those instructions/responses pass through the monitor device 210 (FIG. 2). This adds latency to the instructions and the responses, but simplifies system routing. In another embodiment, as shown in FIG. 3B, the monitor device 210 is attached to the communication links between the processor cores 110 and the network 120. Each of the communication links is bifurcated and feeds the monitor device 210. This way, the monitor device 210 only detects the instructions/responses on the communication links and does not add latency thereto.

In an embodiment, the monitor device 210, the network 120, and/or other components of the system 200 (FIG. 2) are modeled in transaction-level modeling (TLM) instead of register-transfer level (RTL) during an initial development stage of the system 200. TLM separates details of communication among modules from details of hardware implementation of those modules. Therefore, it enables system designers to experiment with different network architectures for rapid prototyping.

Figure 4:
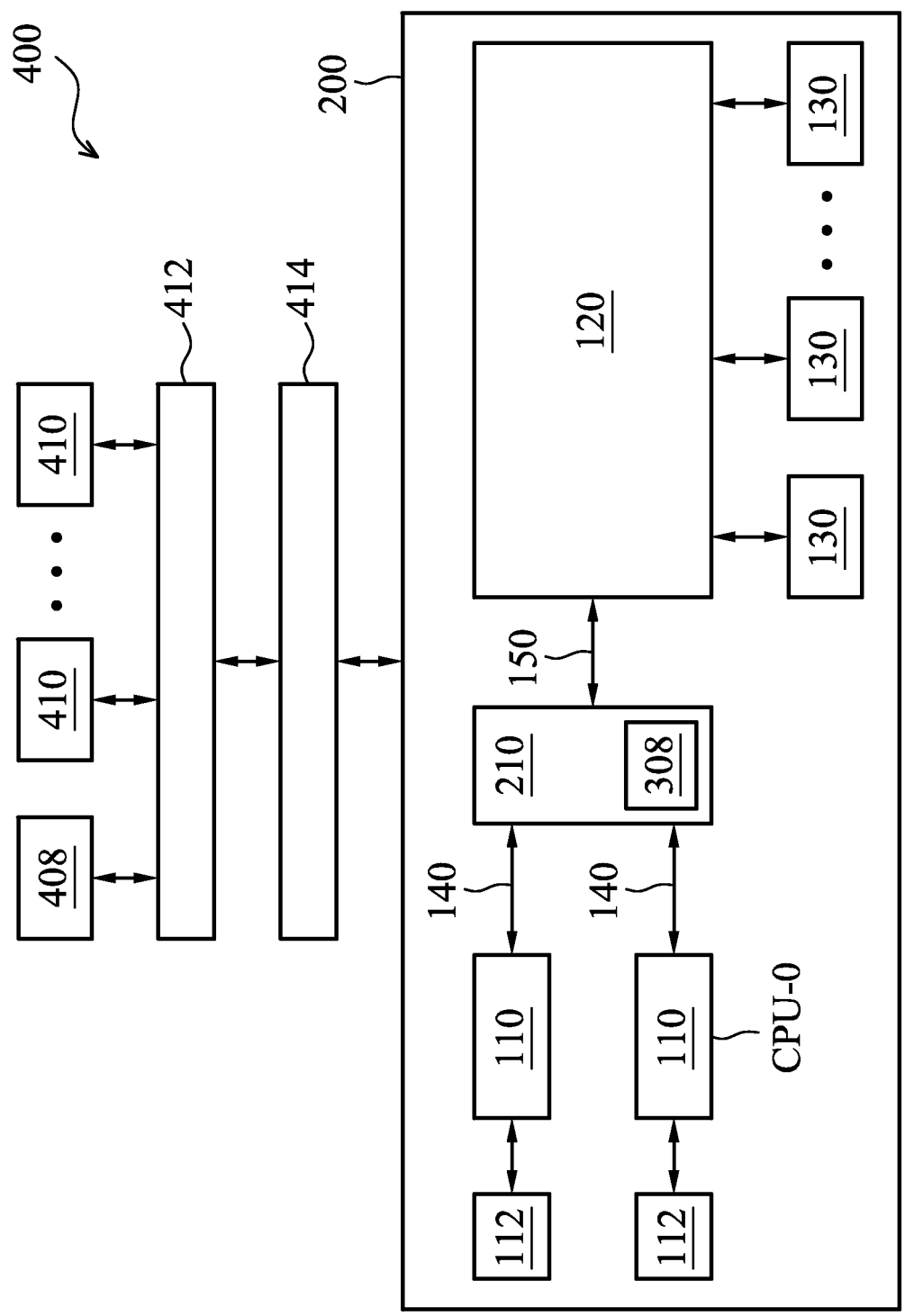
FIG. 4 is an exemplary multi-core system with hardware and software platforms according to various aspects of the present disclosure.

FIG. 4 illustrates a system 400 with both hardware and software platforms according to various aspects of the present disclosure. The system 400 includes a multi-core hardware platform, such as the system 200, an AVFS device driver 414, an OS 412, various tasks (or applications) 410, and an AVFS evaluation task 408. Each of the tasks 410 is executed on one of the processor cores 110. Some tasks may further involve one or more of the peripheral devices 130. The AVFS evaluation task 408 is executed on one of the processor cores 110, which is designated as CPU-0 for the sake of convenience. The AVFS evaluation task 408 causes the CPU-0 to periodically access the transaction statistics stored in the storage unit 308 of the monitor device 210, evaluate some system performance/energy metric, and adaptively adjust the voltage and frequency for each of the processor cores 110. In an embodiment, the CPU-0 runs one or more of the tasks 410 besides the task 408.

Figure 5:
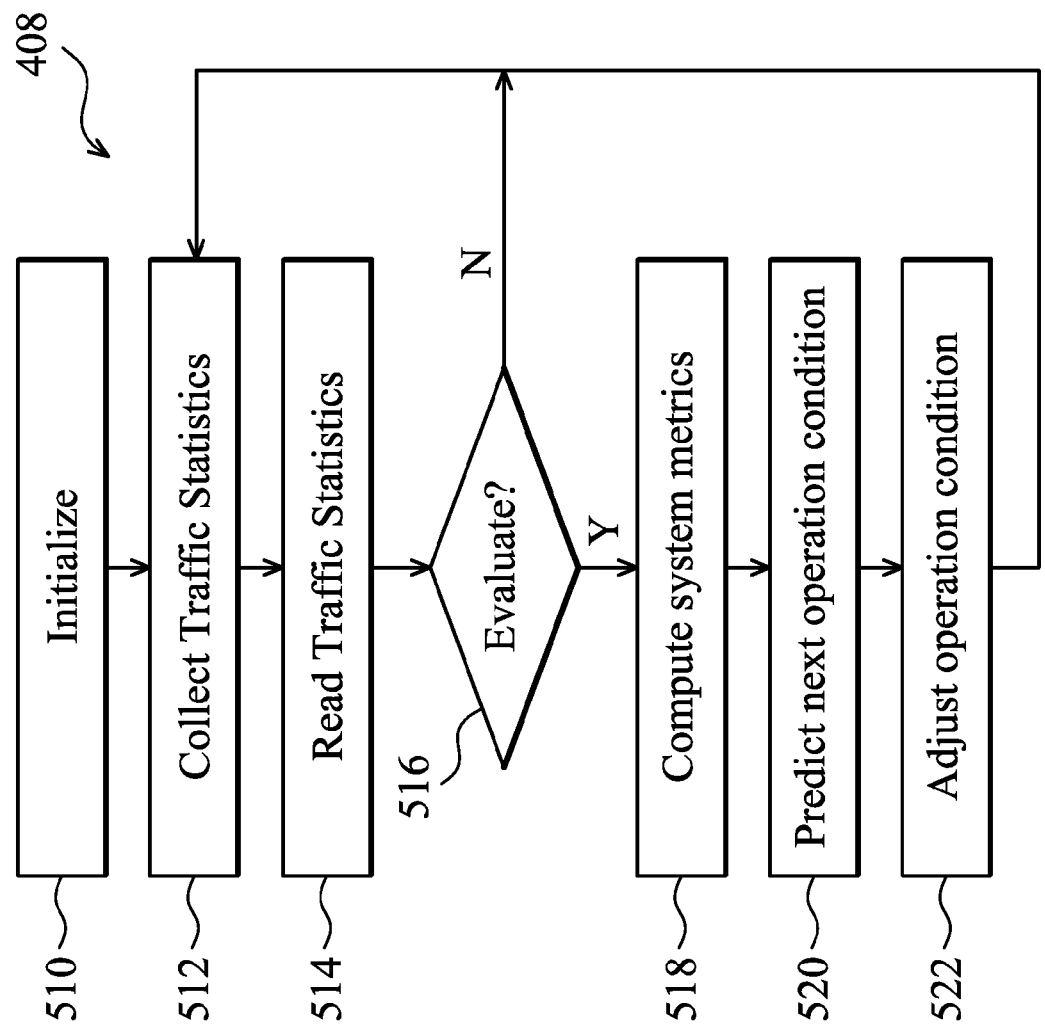
FIG. 5 is a method of adaptively adjust an operation condition of a multi-core system according to various aspects of the present disclosure.

FIG. 5 shows an exemplary AVFS evaluation task 408. The task 408 will be explained below in conjunction with the system 400 of FIG. 4.

At operation 510, the task 408 initializes various system components. For example, it sets an initial power state (e.g. a voltage/frequency setting) for each of the processor cores 110; it clears the storage unit 308 to make it ready for collecting transaction statistics; and so on.

At operation 512, the system 400 executes one or more of the tasks 410 (FIG. 4). As transactions are exchanged between the processor cores 110 and the peripheral devices 130, the monitor device 210 collects the statistics about the transactions, including a delay from when an instruction is transmitted by one of the processor cores 110 to when a response to the instruction is received by the one of the processor cores 110. In an embodiment, the monitor device 210 stores an aggregated delay for each pair of processor and peripheral device, which is a sum of the delays for all the transactions between the pair. The task 408 continues the operation 512 for one sampling period before it transitions to operation 514. The duration of the sampling period is a user-defined parameter and the selection thereof depends on the system 400's target applications. On the one hand, the sampling period should be long enough so that there are enough transactions to be representative of a typical workload for each of the processor cores 110. On the other hand, the sampling period should be short enough so that system operation conditions can be adjusted in a timely manner to meet system performance/energy needs. In an embodiment, the proper setting of the sampling period is determined by running TLM simulations with the system 400. In an embodiment, the sampling period is 20 milliseconds (ms).

At operation 514, the task 408 causes the CPU-0 to read the transaction statistics from the monitor device 210, and stores the results in the CPU-0's local memory. In an embodiment, operation 514 also clears the storage unit 308 of the monitor device 210 so that the transaction statistics gets a fresh start for each sampling period.

At operation 516, the task 408 decides whether it evaluates some system metrics based on the transaction statistics collected so far. For example, the task 408 may evaluate the system 400's performance and/or energy loss profile after every N sampling periods, where N is an integer greater than or equal to 1. If the task 408 decides not to evaluate the system metrics, it transitions back to operation 512 to collect more transaction statistics. Otherwise, it transitions to operation 518.

At operation 518, the task 408 computes a set of system metrics for each of the processor cores 110 based on the transaction statistics collected by the operations 512 and 514 in the preceding sampling period(s). In an embodiment, there are N sampling periods to be evaluated (N is a user-defined integer greater than or equal to 1) and the set of system metrics includes the following, for each integer $i \in [1,N]$:

$T^i_{io}$=IO-bound traffic execution time in the sampling period i;

$T^i_{cpu}$=CPU-bound traffic execution time in the sampling period i;

$\mu^i$=Performance index ($0 \leq \mu^i \leq 1$) in the sampling period i;

$L^i_P$=Performance Loss in the sampling period i;

$L^i_E$=Energy Loss in the sampling period i; and $L^i_T$=Total Loss in the sampling period i.

To calculate one or more of the above system metrics, the following user-defined parameters are used:

Sp=Duration of each of the N sampling periods;

$\mu_{mean}$=Mean performance index for a given power state; and $\alpha$=Trade-off parameter between performance and energy loss ($0 \leq \alpha \leq 1$).

In an embodiment, the following steps are performed to calculate one or more of the above set of system metrics for one of the processor cores 110, which is designated as CPU-n for the sake of convenience:

Step 1: Compute $T^i_{io}$:

$T^i_{io}$=an aggregated delay (or response time) for instructions/responses between the CPU-n and all applicable peripheral devices 130, which is measured by the monitor device 210 during the sampling period i.

Step 2: Compute $T^i_{cpu}$:

$$T^i_{cpu} = S_p - T^i_{io} \quad (1)$$

Step 3: Compute performance index $\mu^i$:

$$\mu^i = \frac{T^i_{cpu}}{S_p} = \frac{(S_p - T^i_{io})}{S_p} = 1 - \left(\frac{T^i_{io}}{S_p}\right) \quad (2)$$

Step 4: Find $\mu_{mean}$ by looking up $\mu_{mean}$ in a user-defined table which maps the current power state of the CPU-n to $\mu_{mean}$ (one example is shown in FIG. 6 with five power states) and compute the performance/energy loss:

$$\text{if } (\mu^i > \mu_{mean}) => L^i_E = 0, L^i_P = \mu^i - \mu_{mean} \quad (3)$$

$$\text{else} => L^i_P = 0, L^i_E = \mu_{mean} - \mu^i \quad (4)$$

Step 5: Compute the total loss with the user-defined trade-off parameter $\alpha$:

$$L^i_T = \alpha \times L^i_P + (1-\alpha) \times L^i_E \quad (5)$$

Step 6: Compute a weighed total loss based on this sampling period and the preceding sampling period, if any, wherein $\beta$ is a user-defined parameter, $0 \leq \beta \leq 1$, and $w^0=0$:

$$w^i = w^{i-1} \times \beta + (1-\beta) \times L^i_T \quad (6)$$

Step 7: Repeat the steps 1-6 for each sampling period $i \in [1,N]$, then compute a probability, $P^i$, for each $i \in [1,N]$ $$P^i = \frac{w^j}{\sum_{j=1}^{N} w^j} \quad (7)$$

Step 8: Select the sampling period k wherein $P^k$ is the maximum probability among the probabilities $P^1$ through $P^N$. Then use one or more of the system metrics measured or calculated for the sampling period k to predict an operation condition of the system 400 for the next evaluation period.

At operation 520, the task 408 uses the set of system metrics calculated at the operation 518 to predict an operation condition of the CPU-n for the next evaluation period. In an embodiment, the task 408 uses the $\mu^k$, which is calculated/determined in Steps (2) and (8) above for the sampling period k, to look up a user-defined table for determining an appropriate power state for the CPU-n. FIG. 7 shows an exemplary user-defined table which has five power states and each of the power states is in a form of a pair of voltage frequency setting. For example, if the $\mu^k$ is 0.45, then the Power State 3 will be chosen.

At operation 522, the task 408 causes the system 400 to adjust the operation condition of the CPU-n by using the AVFS device driver 414 and the respective operations controller device 112.

In an embodiment, the operations 518, 520, and 522 are performed for each of the processor cores 110 one by one. Alternatively, they can be performed for two or more of the processor cores 110 concurrently.

After the operations condition of the processor cores 110 have been adjusted, the task 408 goes back to operation 512 for the next evaluation.

The foregoing outlines features of several embodiments so that those with ordinary skill in the art may better understand the aspects of the present disclosure. Those with ordinary skill in the art should appreciate that they may readily use the present disclosure as a basis for designing or modifying other processes and structures for carrying out the same purposes and/or achieving the same advantages of the embodiments introduced herein. Those with ordinary skill in the art should also realize that such equivalent constructions do not depart from the spirit and scope of the present disclosure, and that they may make various changes, substitutions, and alterations herein without departing from the spirit and scope of the present disclosure.

In one exemplary aspect, the present disclosure is directed to a system that includes a monitoring unit, processing units, and peripheral units. Each of the processing units is linked to the monitoring unit and each of the peripheral units is also linked to the monitoring unit. Each of the processing units is configured to transmit requests to and subsequently receive responses from at least one of the peripheral units through the monitoring unit. The monitoring unit is configured to measure and store delays between the responses and the respective requests.

In another exemplary aspect, the present disclosure is directed to a multi-core system. The multi-core system includes a first plurality of processor cores and a second plurality of peripheral devices that are configured to receive instructions from the first plurality and send respective responses to the first plurality through a communication network. The multi-core system further includes a traffic monitor device that is configured to monitor the instructions and the respective responses on the communication network and to store a record for at least some of the instructions and the respective responses. The multi-core system further includes a memory comprising a set of computer readable instructions that when executed by one of the first plurality, cause the system to access the record, evaluate a policy based at least partially on the record, and adjust an operation condition of the system based on the policy.

In another exemplary aspect, the present disclosure is directed to a method of managing power consumption of a multi-core system, wherein the multi-core system includes processor cores linked to peripheral devices, and each of the processor cores is configured to operate at a respective first power state and is further configured to transmit instructions to and receive responses from at least one of the peripheral devices. The method includes measuring a first execution time within a sampling period for each of the processor cores, wherein the first execution time is an aggregated instruction-response delay of the instructions sent by the respective processor core. The method further includes computing a first set of metrics based at least on the first execution time and a first set of user-defined criteria for each of the processor cores. The method further includes, for each of the processor cores, predicting a second power state based at least on the first set of metrics and a second set of user-defined criteria, and adjusting an operation condition of the respective processor core based on the second power state.

What is claimed is:

1. A system comprising:
   a monitoring unit;
   processing units, wherein each of the processing units is linked to the monitoring unit;
   peripheral units, wherein each of the peripheral units is linked to the monitoring unit,
   wherein:
   each of the processing units is configured to transmit requests to and subsequently receive responses from at least one of the peripheral units through the monitoring unit; and
   the monitoring unit is configured to measure and store delays between the responses and the respective requests; and
   a device that is coupled to the monitoring unit and is configured to periodically perform the steps of:
   accessing the delays stored in the monitoring unit;
   computing a performance metric of the system based at least on the delays;
   predicting a power state for the processing units based at least on the performance metric and a set of user-defined criteria; and
   causing the system to adjust an operation condition of the processing units based on the power state.

2. The system of claim 1, wherein the power state includes:
   a setting of an operating frequency of the system; and
   a setting of a power supply voltage of the system.

3. The system of claim 1, wherein the monitoring unit is implemented in transaction-level modeling (TLM).

4. The system of claim 1, wherein one of the peripheral units is of a type of: a timer, a wired network interface controller, a wireless network interface controller, an UART device, a DMA controller, a USB device, or a display.

5. The system of claim 1, wherein the monitoring unit includes:
   a storage unit; and
   control logic to perform functions of:
   recording a first time when the monitoring unit detects a request from one of the processing units to one of the peripheral units;
   recording a second time when the monitoring unit detects a respective response from the one of the peripheral units;
   computing a first difference between the first time and the second time; and
   updating a record in the storage unit with the first difference, wherein the record is uniquely associated with the one of the processing units.

6. The system of claim 1, wherein the device is one of the processing units that is coupled to a memory unit having a set of computer readable instructions that, when executed by the one of the processing units, cause the one of the processing units to perform the steps of accessing, computing, predicting, and causing the system to adjust.

7. The system of claim 1, wherein the device is configured to simultaneously perform the steps of accessing, computing, predicting, and causing for at least two of the processing units.

8. A multi-core system comprising:
   a first plurality of processor cores;
   a second plurality of peripheral devices that are configured to receive instructions from the first plurality and send respective responses to the first plurality through a communication network;
   a traffic monitor device that is configured to monitor the instructions and the respective responses on the communication network and to store a record for at least some of the instructions and the respective responses; and
   a memory comprising a set of computer readable instructions that when executed by one of the first plurality, cause the system to perform the steps of:
   accessing the record;
   evaluating a policy based at least partially on the record;
   predicting a power state of the system based on the evaluation; and
   adjusting an operation condition of the system based on the power state,
   wherein the evaluating of the policy includes, for each of the processor cores:
   calculating an instruction-execution time within a sampling period;
   computing a loss of performance and energy based at least on the instruction-execution time and the sampling period; and
   repeating the calculating of the instruction-execution time and the computing of the loss of performance and energy for N sampling periods, wherein N is a user-defined integer and N is greater than 1,
   wherein the predicting of the power state is based on a comparison of the loss of performance and energy among the N sampling periods.

9. The multi-core system of claim 8, wherein the operation condition is: a clock frequency of the system, a power supply voltage of the system, or a combination thereof.

10. The multi-core system of claim 8, further comprising a device coupled to one of the processor cores and controls: a supply voltage of the one of the processor cores, an operating frequency of the one of the processor cores, or a combination thereof.

11. The multi-core system of claim 8, wherein the record is stored in a register stack that is configured to include:
   a plurality of entries;
   each of the entries is uniquely associated with one of the processor cores; and each of the entries includes a delay that is associated with instructions and respective responses between the one of the processor cores and at least one of the peripheral devices.

12. The multi-core system of claim 8, wherein the traffic monitor device is implemented in transaction-level modeling (TLM).

13. The multi-core system of claim 8, wherein one of the second plurality of peripheral devices is of a type of: a timer, a wired network interface controller, a wireless network interface controller, an UART device, a DMA controller, a USB device, or a display.

14. A method of managing power consumption of a multi-core system, wherein the multi-core system includes processor cores linked to peripheral devices, and each of the processor cores is configured to operate at a respective first power state and is further configured to transmit instructions to and receive responses from at least one of the peripheral devices, the method comprising the steps of, for each of the processor cores:
measuring a first execution time within a sampling period, wherein the first execution time is an aggregated instruction-response delay of the instructions sent by the respective processor core;
computing a first set of metrics based at least on the first execution time and a first set of user-defined criteria;
predicting a second power state based at least on the first set of metrics and a second set of user-defined criteria; and
adjusting an operation condition of the respective processor core based on the second power state; and
the method further comprising: simultaneously performing the measuring, computing, predicting, and adjusting steps for at least two of the processor cores.

15. The method of claim 14, wherein the measuring the first execution time includes the steps of:
initializing a computer accessible storage unit;
recording a start time when an instruction is transmitted from the respective processor core to one of the peripheral devices;
recording a finish time when a response to the instruction is transmitted from the one of the peripheral devices to the respective processor core;
computing a delay from the start time to the finish time;
adding the delay to the computer accessible storage unit; and
repeating the recording steps, the computing step, and the adding step within the sampling period.

16. The method of claim 14, wherein the adjusting the operation condition of the respective processor core includes:
adjusting a power supply voltage of the respective processor core; and
adjusting an operating frequency of the respective processor core.

17. The method of claim 16, wherein the adjusting the power supply voltage is one of:
increasing the power supply voltage;
decreasing the power supply voltage; and
maintaining the power supply voltage substantially unchanged.

18. The method of claim 16, wherein the adjusting the operating frequency is one of:
increasing the operating frequency;
decreasing the operating frequency; and
maintaining the operating frequency substantially unchanged.

19. The method of claim 14, wherein the computing the first set of metrics includes the steps of:
computing a second execution time by subtracting the first execution time from the sampling period;
computing a first performance index, $\mu_1$, as a ratio of the second execution time to the sampling period;
obtaining a second performance index, $\mu_2$, based on the first set of user-defined criteria and the first power state of the respective processor core;
computing a performance loss, $L_P$, and an energy loss, $L_E$, as follows:

if $\mu_1 > \mu_2$, then $L_P = \mu_1 - \mu_2$, and $L_E = 0$;

else $L_P = 0$, and $L_E = \mu_2 - \mu_1$; and computing a total loss, $L_T$, as $L_T = \alpha \times L_P + (1-\alpha) \times L_E$, wherein $\alpha$ is a user-defined parameter and $0 \leq \alpha \leq 1$.

20. The method of claim 19, further comprising, before the predicting step:
repeating the measuring step and the computing the first set of metrics step for N sampling periods, wherein N is a user-defined integer and N is greater than 1;
computing a weighted total loss, $W^i$, for each i-th sampling period of the N sampling periods as: $W^i = \beta \times W^{i-1} + (1-\beta) \times L_T^i$, for all integer $i \in [1, N]$, wherein $L_T^i$ is the total loss of the i-th sampling period, $\beta$ is a user-defined parameter, $0 \leq \beta \leq 1$, and $W^0 = 0$;
computing a probability, $P^j$, for each j-th sampling period of the N sampling periods as:

$$P^j = \frac{W^j}{\sum_{k=1}^{N} W^k}$$

for all integer $j \in [1, N]$; and
selecting the first set of metrics of the m-th sampling period to be used by the predicting step, wherein $1 \leq m \leq N$ and the m-th sampling period's probability, $P^m$, is the maximum probability among all the probabilities $P^1$ through $P^N$.

* * * * *